(12) United States Patent
Burchett (10) Patent No.: US 12,533,909 B2
(45) Date of Patent: Jan. 27, 2026

(54) SPINDLE SEAL AND POWERTRAIN SYSTEM

(71) Applicant: Allison Transmission, Inc., Indianapolis, IN (US)

(72) Inventor: Douglas S. Burchett, Martinsville, IN (US)

(73) Assignee: Allison Transmission, Inc., Indianapolis, IN (US)

(*) Notice: Subject to any disclaimer, the term of this patent is extended or adjusted under 35 U.S.C. 154(b) by 0 days.

(21) Appl. No.: 18/645,522

(22) Filed: Apr. 25, 2024

(65) Prior Publication Data
US 2025/0332866 A1    Oct. 30, 2025

(51) Int. Cl.
*B60B 37/04*    (2006.01)
*B60B 27/00*    (2006.01)
*B60B 35/16*    (2006.01)

(52) U.S. Cl.
CPC .......... B60B 37/04 (2013.01); B60B 27/0015 (2013.01); B60B 27/0073 (2013.01); B60B 35/16 (2013.01); *B60B 2900/323* (2013.01); *B60B 2900/3312* (2013.01)

(58) Field of Classification Search
CPC . B60B 37/04; B60B 27/0015; B60B 27/0073; B60B 35/16; B60B 2900/323; B60B 2900/3312
See application file for complete search history.

(56) References Cited

U.S. PATENT DOCUMENTS

| | | | |
|---|---|---|---|
| 8,689,445 B2 | 4/2014 | White et al. | |
| 2013/0219681 A1 | 8/2013 | Rode | |
| 2015/0174956 A1 | 6/2015 | Malik | |
| 2020/0340534 A1* | 10/2020 | Yu | F16C 33/1055 |
| 2023/0249496 A1* | 8/2023 | Regan | F16C 33/726 384/477 |
| 2025/0001852 A1* | 1/2025 | Lenon | B60K 17/16 |

FOREIGN PATENT DOCUMENTS

KR    20160121061 A  * 10/2016

OTHER PUBLICATIONS

KR 20160121061 A Machine English Translation (Year: 2016).*

* cited by examiner

*Primary Examiner* — Jason D Shanske
*Assistant Examiner* — Matthew James O'Neill
(74) *Attorney, Agent, or Firm* — Taft Stettinius & Hollister LLP; Stephen F. Rost (57) ABSTRACT

A spindle assembly of an axle assembly includes an elongate body partially forming a first cavity and a second cavity. A seal is coupled to the elongate body at a location between the first cavity and the second cavity, and the seal is configured to be in contact with an axle shaft to fluidly seal the first and second cavities from one another. A breather is coupled to the elongate body and disposed in fluid communication with the second cavity. A sleeve is also coupled to the elongate body. The sleeve includes a notch that forms at least a portion of a drainage passage through which a fluid in the second cavity may flow from an upper portion of the second cavity to a lower portion thereof.

19 Claims, 6 Drawing Sheets

SPINDLE SEAL AND POWERTRAIN SYSTEM

FIELD OF THE DISCLOSURE

The present disclosure relates, generally, to powertrain configurations for vehicles, and, more specifically, to powertrain configurations for commercial and/or electric vehicles.

BACKGROUND

A powertrain incorporated into a vehicle may include one or more drive unit(s) and one or more transaxles coupled to the one or more drive unit(s) and to one or more wheel(s) of the vehicle to transmit rotational power supplied from the one or more drive unit(s) to the one or more wheel(s). The one or more wheel(s) may be coupled to, and/or supported for rotation by, one or more bearing(s) requiring lubrication. Systems, devices, and/or methods for lubricating such bearing(s) that avoid drawbacks associated with some configurations remain an area of interest.

SUMMARY

The present disclosure may comprise one or more of the following features and combinations thereof.

In one implementation of the present disclosure, an axle assembly for a vehicle includes an axle housing having a first end and a second end, the axle housing configured to receive a first portion an axle shaft; an axle spindle coupled to the second end of the axle housing, the axle spindle configured to receive a second portion of the axle shaft; a wheel end assembly coupled to the axle shaft, the wheel end assembly comprising an outer surface configured to receive a ground-engaging mechanism of the vehicle; a seal coupled to the axle spindle, the seal disposed in contact with an outer surface of the axle shaft; and a breather coupled to the axle spindle at a location spaced from the seal; wherein, the axle housing, axle spindle, and the axle shaft form a first cavity; wherein, the axle spindle, wheel end assembly, and the axle shaft form a second cavity; wherein, the seal is positioned between the first cavity and the second cavity, the seal configured to fluidly seal the first cavity from the second cavity.

In one example of this implementation, the breather is located between the second cavity and ambient air external to the axle assembly. In a second example, a sleeve is coupled to the axle spindle, the sleeve comprising a notch formed therein; wherein, the second cavity comprises an upper portion and a lower portion, the upper portion fluidly coupled to the lower portion; wherein, the notch forms at least a portion of a drainage passage that fluidly couples the upper portion to the lower portion. In a third example, a bearing assembly is coupled between the wheel end assembly and the axle spindle, the bearing assembly positioned in the second cavity; wherein, a portion of the bearing assembly is in contact with the sleeve.

In a fourth example, the second cavity is configured to hold a fluid therein, the seal arranged to prevent leakage of the fluid from the second cavity to the first cavity. In a fifth example, the axle spindle includes an elongated channel formed therein, the elongated channel located between the second cavity and the breather. In a sixth example, the elongated channel is located between the sleeve and the breather. In a seventh example, the second cavity is fluidly coupled to the breather via the notch and the elongated channel.

In another example, the elongated channel is oriented in a generally horizontal arrangement between the second cavity and the breather. In a further example, the elongated channel includes a plurality of elongated channels formed in the axle spindle. In yet a further example, the notch includes a plurality of notches formed in the sleeve.

In another implementation of the present disclosure, a spindle assembly is provided for an axle assembly having an axle housing, an axle shaft, and a wheel end assembly. The spindle assembly includes an elongate body configured to be coupled to the axle housing, the elongate body partially forming a first cavity and a second cavity; a seal coupled to the elongate body at a location between the first cavity and the second cavity, the seal configured to be in contact with the axle shaft to fluidly seal the first and second cavities from one another; a breather coupled to the elongate body, the breather disposed in fluid communication with the second cavity; and a sleeve coupled to the elongate body, the sleeve comprising a notch formed therein; wherein, the notch forms at least a portion of a drainage passage through which a fluid in the second cavity may flow from an upper portion of the second cavity to a lower portion thereof.

In one example of this implementation, the seal includes a double lip seal having a first leg and a second leg. In a second example, the first leg of the seal is in fluid communication with the first cavity, and the second leg of the seal is in fluid communication with the second cavity. In a third example, the notch includes a plurality of notches formed in the sleeve. In a fourth example, an elongated channel is formed in the elongated body, the elongated channel located between the second cavity and the breather.

In another example, the elongated channel is located between the sleeve and the breather. In yet another example, the second cavity is fluidly coupled to the breather via the notch and the elongated channel. In still another example, the elongated channel includes a plurality of elongated channels formed in the elongated body.

In a further implementation of the present disclosure, a vehicle includes a chassis; a plurality of wheels coupled to the chassis; and a powertrain mounted to the chassis comprising a transaxle that includes a housing, an axle assembly at least partially disposed in the housing, and an axle shaft rotatably driven by the powertrain; wherein the axle assembly includes an axle spindle coupled to the second end of the axle housing, the axle spindle configured to receive a second portion of the axle shaft; a wheel end assembly coupled to the axle shaft, the wheel end assembly comprising an outer surface configured to receive at least one of the plurality of wheels; a seal coupled to the axle spindle, the seal disposed in contact with an outer surface of the axle shaft; and a breather coupled to the axle spindle at a location spaced from the seal; wherein, the axle spindle and the axle shaft at least partially form a first cavity for holding a first fluid; wherein, the axle spindle, wheel end assembly, and the axle shaft form a second cavity for holding a second fluid, the first fluid and the second fluid comprising different viscosities; wherein, the seal is positioned between the first cavity and the second cavity, the seal configured to fluidly seal the first cavity from the second cavity.

These and other features of the present disclosure will become more apparent from the following description of the illustrative embodiments.

BRIEF DESCRIPTION OF THE DRAWINGS

The present disclosure described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Figure 1:
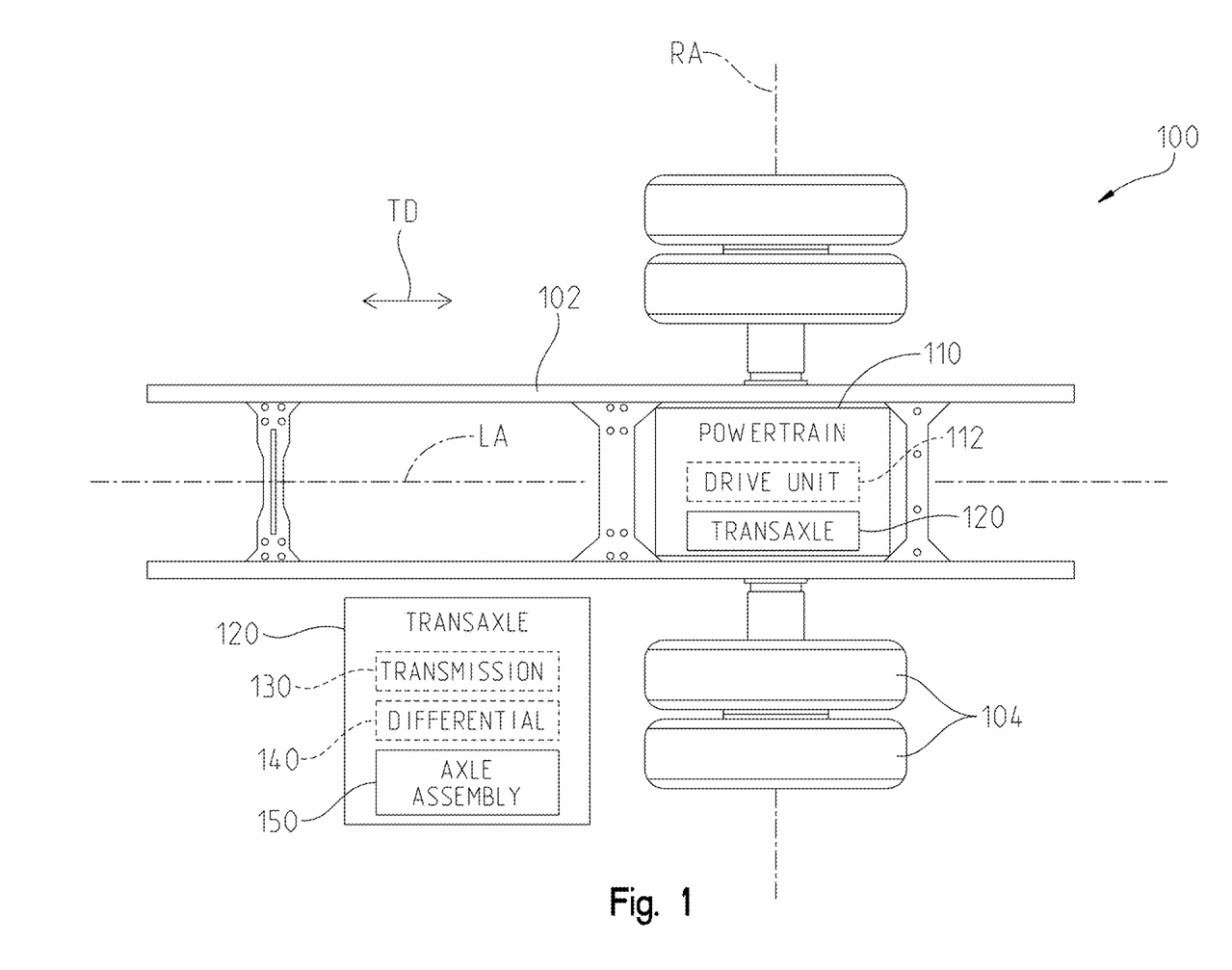
FIG. 1 is a partial diagrammatic depiction of a powertrain adapted for use in a vehicle.

Referring now to FIG. 1, an illustrative vehicle 100 includes a chassis or main frame 102, wheels 104 coupled to the chassis 102 and each configured for rotation about a rotational axis RA, and a powertrain 110 mounted to the chassis 102. In the illustrative embodiment, the powertrain 110 is embodied as, or otherwise includes, a collection of devices that are cooperatively capable of generating and transmitting rotational power to the wheels 104 of the vehicle 100 to propel the vehicle 100 in use thereof. In some embodiments, the powertrain 110 is mounted to the chassis 102 transverse to a longitudinal axis LA along which the chassis 102 extends. In those embodiments, the powertrain 110 is arranged transverse to a travel direction TD of the vehicle 100, and the powertrain 110 may be said to have a transverse mounting arrangement relative to the chassis 102. In other embodiments, however, the powertrain 110 may be mounted to the chassis 102 in another suitable manner.

In the illustrative embodiment, the powertrain 110 includes a drive unit 112 (shown in phantom in FIG. 1) to generate rotational power. The drive unit 112 may be embodied as, or otherwise include, any device or collection of devices capable of generating rotational power that may be transmitted to the wheels 104 to drive movement of the vehicle 100. The illustrative drive unit 112 is embodied as, or otherwise includes, one or more electric motors. Because the powertrain 110 incorporates one or more electric motors or powerplants, at least in some embodiments, the vehicle 100 is embodied as, or otherwise includes, an electric vehicle. In one example, the vehicle 100 is embodied as, or otherwise includes, a medium or heavy-duty electric truck or electric bus, and the powertrain 110 is employed in lieu of one or more conventional powertrain(s) associated with one or more internal combustion engine configuration(s). In any case, operation of the drive unit 112 may be controlled by an engine control module (not shown) that includes one or more processors and one or more memory devices.

The illustrative powertrain 100 also includes a transaxle 120 coupled to the drive unit 112 to receive rotational power therefrom and transmit rotational power to the wheels 104. The transaxle 120 may be embodied as, or otherwise include, any collection of devices capable of receiving rotational power from the drive unit 112 and transmitting rotational power to the wheels 104. In the illustrative embodiment, the transaxle 120 includes a transmission 130 (shown in phantom in FIG. 1), a differential 140 (shown in phantom in FIG. 1) coupled to the transmission 130, and an axle assembly 150 coupled to the differential 140. The transaxle 120 may include gearing (not shown) for transmitting rotational power to the wheels such as, but not limited to, one or more gears, planetary gearsets, and the like.

Figure 2:
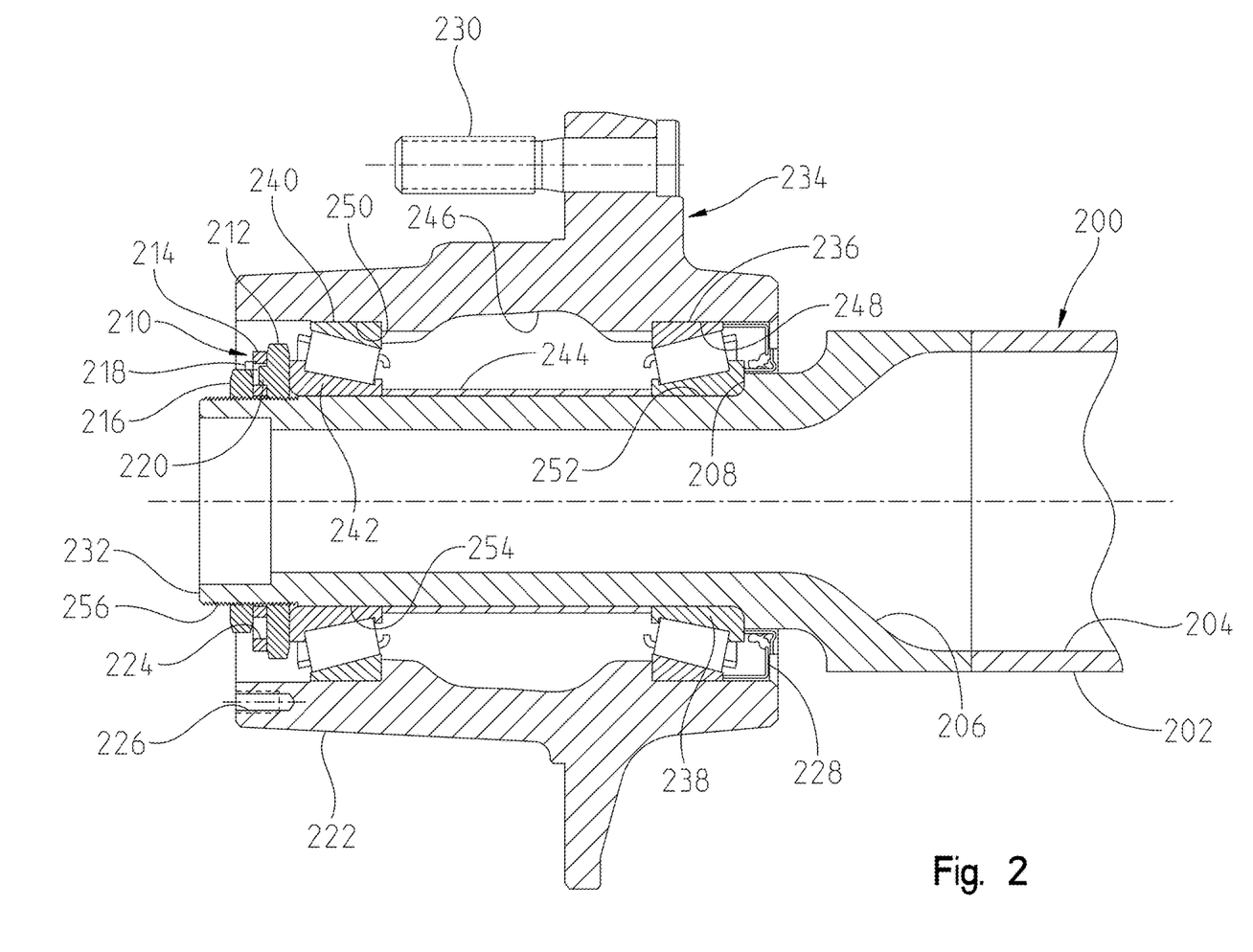
FIG. 2 is a partial longitudinal cross-sectional view of a portion of an implementation of an axle assembly for use in a vehicle.

Referring to FIG. 2, one implementation of an axle assembly for a vehicle is partially illustrated. As shown, an axle 200 may depend from and extend transversely across the chassis 102 of a vehicle 100, such as the one depicted in FIG. 1. In some implementations, a vehicle 100 may include a plurality of non-drive axles 200 suspended from the chassis, with each of the axles having a wheel end assembly 234 mounted on each end of the axle. Since each of the ends of the axle 200 and its associated wheel end assembly 234 are generally the same, only one axle end and wheel end assembly 234 will be described herein. The axle 200 includes a central tube 202, and an axle spindle 232 is integrally coupled by any means, e.g., welding, to each end of the central tube 202. The central tube 202 may be tubular-shaped and formed with an internal cavity 204. The axle spindle 232 is formed with a corresponding internal cavity 206.

The wheel end assembly 234 includes a bearing assembly having an inboard or first bearing 236 including its bearing cone 238, and an outboard or second bearing 240 including its bearing cone 242, each of which is immovably mounted on the outboard or outer end of axle spindle 232. The first bearing 236 and the second bearing 240 may be tapered roller bearings in some implementations. In the arrangement of FIG. 2, first bearing 236 is mounted on the outer diameter of the axle spindle 232 and has its inboard or inner surface in abutment or contact with a shoulder 208 formed in the axle spindle 232. The second bearing 240 is mounted on the axle spindle 232 near the outboard or outer end of the axle spindle 232. A cavity 246 is defined by the first and second bearings 236, 240, the spindle axle 232, and a wheel hub 222. A bearing spacer 244 may optionally be disposed between the first and second bearings 236, 240 in the cavity 246 to maintain proper spacing between the bearings.

In the implementation of FIG. 2, the first bearing cone 238 of the first bearing 236, the second bearing cone 242 of the second bearing 240, and any bearing spacer 244 can form a bearing cone and spacer assembly. An axle spindle nut assembly 210, which includes an inboard or first nut 212, a lock washer 214, an outboard or second nut 216, and a set screw 218 may threadably engage the outer end of the axle spindle 232 to secure the first and second bearing cones 238, 242 and bearing spacer 244 of the bearing cone and spacer assembly in place and to provide a clamp force on the bearing cone and spacer assembly.

The first nut 212 may threadably engage the axle spindle 232 and contact the outboard end of the second bearing 240. In the axle assembly of FIG. 2, the lock washer 214 is disposed on an outward side (i.e., outboard of) of the first nut 212 and include a tab (not shown) that engages a keyway (not shown) formed in axle spindle 232 to prevent rotation of the lock washer 214. A nub or pin 220 that is punched or otherwise formed in the first nut 212 extends into a selected one of a plurality of openings 224 formed in the lock washer 214 to provide a coarse interlock to reduce unwanted rotation of the inboard nut. However, to install the lock washer 214, the first nut 212 typically must undesirably be rotated out of position in order to enable the nub or pin 220 to align with a selected one of openings 224. The lock washer 214 also includes a plurality of tapped openings (not shown), a selected one of which threadably receives the set screw 218 once the second nut 216 has been installed. The second nut 34 threadably engages the axle spindle 232 and abuts the lock washer 214. The openings that are formed in the lock washer 214 are radially proximate to wrench flats formed on the second nut 216, so that the installation of the set screw 218 in a selected opening creates a positive stop against a corresponding outer flight of the second nut 216, thereby preventing the second nut 216 from rotating enough to enable undesirable rotation of the first nut 212.

The wheel hub 222 is rotatably mounted on the first and second bearings 236, 240 in a manner known to those skilled in the art. A hubcap (not shown) is mounted on the outboard end of the hub 222 by a plurality of bolts that each pass through a respective one of a plurality of openings formed in the hubcap, and threadably engage a respective one of a plurality of aligned threaded openings 226 formed in the hub. In this manner, the hubcap closes the outboard end of the wheel end assembly 234. A main continuous seal 228 is rotatably mounted on the inboard end of wheel end assembly 234 and closes the inboard end of the assembly 234. More particularly, the main seal 228 is mounted on the wheel end assembly 234 in a suitable manner and radially bridges the hub 222 and the axle spindle 232 to seal the cavity 246. In order to maintain proper lubrication and operation of first and second bearings 236, 240, a suitable amount of lubricant (not shown) is introduced into the cavity 246. A plurality of interference-fit studs or fasteners 230 are used to mount a brake drum, tire rim and tire (not shown) on the wheel end assembly 234.

With reference to the implementation of FIG. 2, the wheel hub 222 is formed with a first bearing surface 248 for the first bearing 236 and a second bearing surface 250 for the second bearing 56. Further, the axle spindle 232 includes a third bearing surface 252 for the first bearing 236, a fourth bearing surface 254 for the second bearing 240, and threads 256 for engaging the first and second axle spindle nuts 212, 216.

In the implementation of FIG. 2, an axle shaft is not shown. When assembled to the axle assembly, the axle shaft may be disposed in the cavity 204 and coupled to the wheel end assembly 234 via one or more fasteners (not shown). In the implementation of FIG. 2, the axle shaft (not shown) may be coupled to the wheel end assembly 234 at an outboard or outer location via the threaded opening 226.

Figure 3:
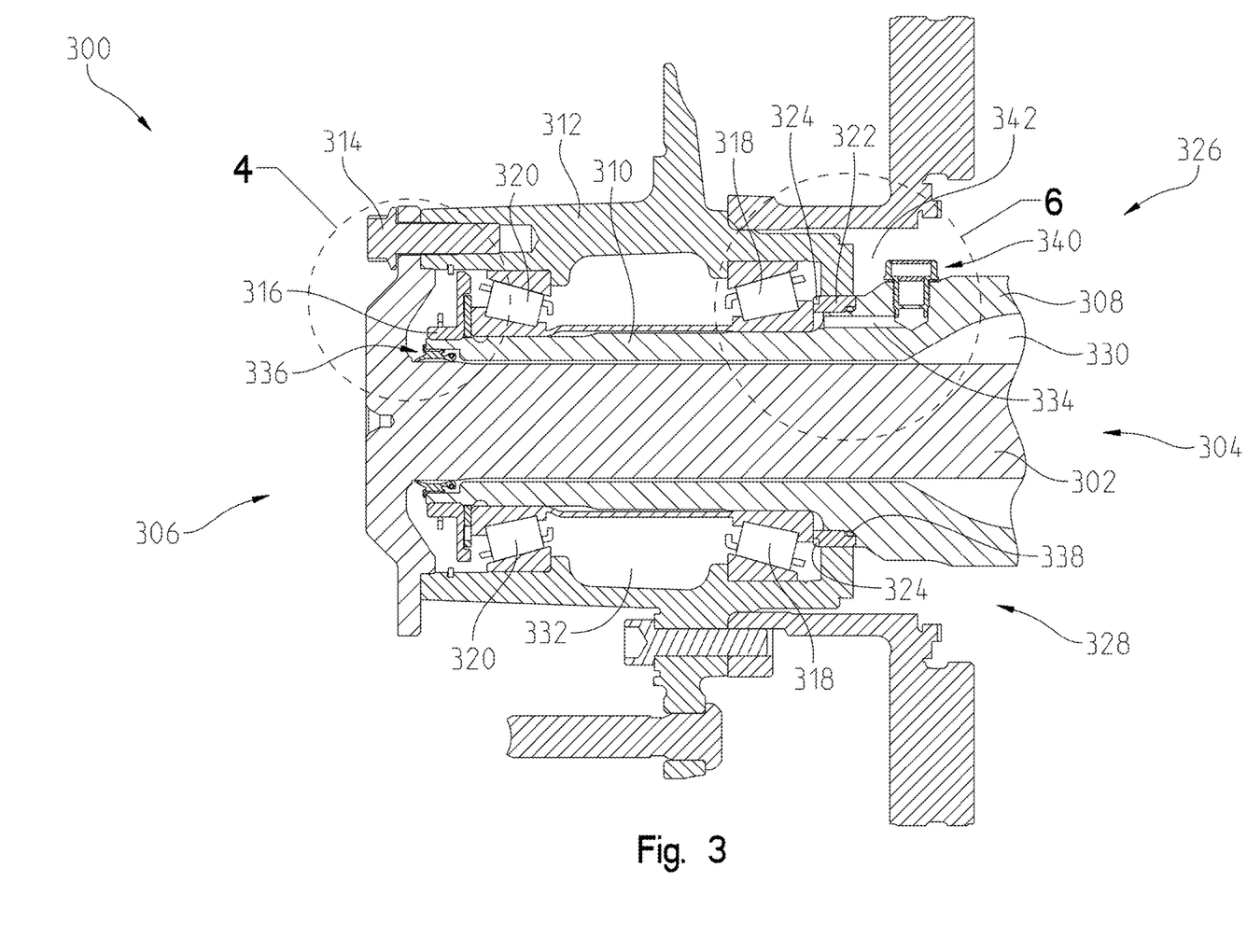
FIG. 3 is another partial longitudinal cross-sectional view of a portion of another implementation of an axle assembly for use in a vehicle.

Referring to FIG. 3, another implementation of an axle assembly for a vehicle is partially shown. In this implementation, an axle assembly 300 may be coupled to and extend transversely across the chassis 102 of a vehicle 100, similar to that shown in FIG. 1. As shown, the axle assembly 300 is shown including a first or inner end 304 and a second or outer end 306. The one or more wheels or ground-engaging mechanisms 104 may be coupled to the axle assembly 300 at or proximate to its second end 306. The one or more wheels or ground-engaging mechanisms (e.g., tracks) may be mounted or arranged on a wheel hub, similar to the wheel hub 222 of FIG. 2.

In the implementation of FIG. 3, the axle assembly 300 may include an axle shaft 302 that passes through an internal cavity defined at least partially by a combination of an axle housing or tube 308 and an axle spindle 310. In some implementations, the axle tube 308 and axle spindle 310 may be configured as separate components coupled to one another. In another implementation, the axle tube 308 and axle spindle 310 may be integrally formed as a single cast configuration. In any event, the internal cavity, or first cavity 330 as shown in FIG. 3, may be formed as a longitudinal cavity defined between at least the first end 304 and the second end 306 of the axle assembly 300. The axle housing or tube 308 may be tubular or cylindrically-shaped housing that at least partially forms the first cavity 330. The inner diameter of the axle housing or tube 308 may be sized for receiving the axle shaft 302.

In FIG. 3, a wheel end assembly 312 may be coupled or mounted to or proximate to the second end 306 of the axle assembly 300. Moreover, a fastener 314 may be used for coupling the wheel end assembly 312 to the axle shaft 302. In this manner, the axle shaft 302 may be rotatably driven by a drive unit, such as the drive unit 112 of FIG. 1. The rotation of the axle shaft 302 may rotatably drive the wheel end assembly 312 due to the connection between the axle shaft 302 and the wheel end assembly 312.

The wheel end assembly 312 may include a first bearing assembly and a second bearing assembly. In one implementation, the first bearing assembly may include a first tapered roller bearing 318. In another implementation, the second bearing assembly may include a second tapered roller bearing 320. In some implementations, the first and second bearing assemblies may both include tapered roller bearings. In other implementations, the first and second bearing assemblies may include other types of bearings. In any event, in FIG. 3, the first bearing assembly is illustrated as a first tapered roller bearing 318 and the second bearing assembly is illustrated as a second tapered roller bearing 320. In this implementation, the first tapered roller bearing 318 and the second tapered roller bearing 320 may be coupled to the axle spindle 310, as shown in FIG. 3. The pair of tapered roller bearings facilitate the rotational movement of the wheel end assembly 312 relative to the axle spindle 310, which does not rotate. Although not shown, a spacer may be positioned between the first and second tapered roller bearings to maintain the longitudinal spacing therebetween.

In FIG. 3, a second cavity 332 is shown being formed between the first tapered roller bearing 318, the second tapered roller bearing 320, the wheel end assembly 312, and the axle spindle 310. As will be described in more detail below, the second cavity 332 is configured to be filled with a fluid that helps lubricate the first and second tapered roller bearings 318, 320.

In the implementation illustrated in FIG. 3, a lock nut assembly 316 may be located towards the second end of the axle assembly 300. The lock nut assembly 316 may include a lock nut coupled to the axle spindle 310. For purposes of this disclosure, the lock nut assembly 316 may be coupled to the axle spindle 310 in any manner such as a threaded connection. The lock nut assembly 316 may be any conventional lock nut assembly known in the art for axle assemblies.

The axle assembly 300 of FIG. 3 is shown including a plurality of cavities including the first cavity 330 and the second cavity 332. In conventional axle assemblies, the first and second cavities are fluidly coupled to one another such that a single fluid may flow therebetween. As such, the single fluid is designed specifically to provide lubrication to the different bearing assemblies as well as the rotation of the axle shaft, among other components of the axle assembly. In the implementation of FIG. 2, for example, fluid may flow between the cavity 204, the internal spline cavity 206, and cavity 246. In this implementation, the fluid located in cavity 246 is the same as the fluid in cavities 204, 206. In some implementations, however, there may be a desire to utilize more than one fluid (e.g., oil) in the axle assembly to improve efficiency while maintaining durability and reliability of the wheel ends. Moreover, there may be cost advantages to using different viscosity fluids in different cavities of the axle assembly. In some implementations, for example, service intervals using different fluids may increase from 250,000 miles to 500,000 miles. This example is not intended to be limiting, but rather is provided only to give context to the advantage of using multiple fluids in the axle assembly. The use of different fluids may further extend the life of wheel end assemblies.

Figure 4:
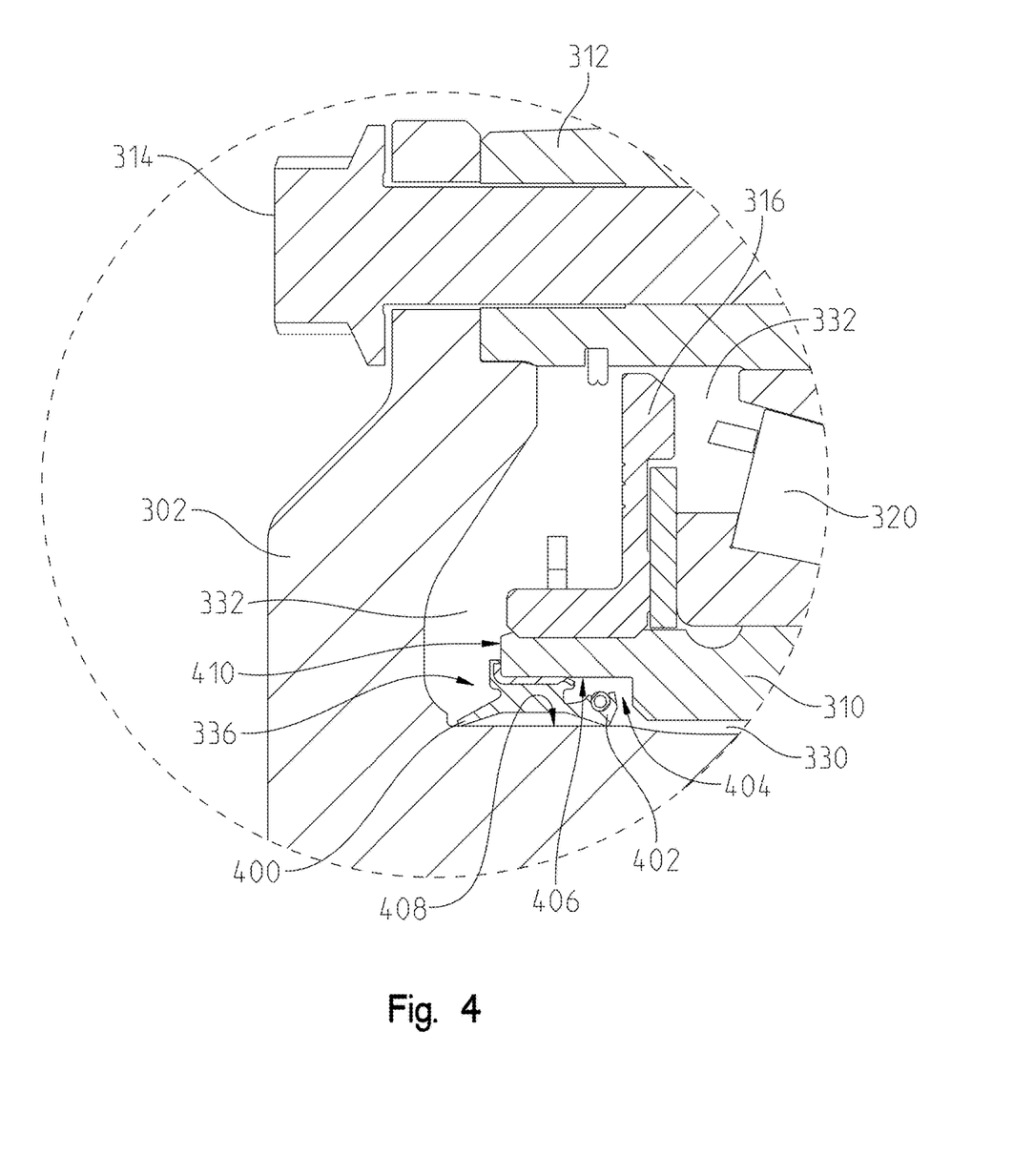
FIG. 4 is an enlarged cross-section view of the implementation of the axle assembly of FIG. 3.

Referring to the implementation of FIG. 3, a seal in the form of a double lip seal 336 is shown. Although the seal 336 is shown as a double lip seal, it is to be understood the seal 336 may take other forms and still function in the same way as described herein. For example, in one implementation, the seal may be a lathe cut shaft seal that is positioned within a groove or notch (not shown) formed in the axle shaft 302. In other implementations, the seal 336 may be located in the axle housing 308 and coupled to the axle spindle 310. In order to accommodate the seal 336 in the illustrated implementation of FIG. 3, the axle spindle 310 may be modified by removing material and the axle shaft 302 may be modified by adding material to form a seal journal or bore. In FIG. 4, for example, an upper portion 326 of the axle assembly 300 is illustrated. The seal 336, however, extends to a lower portion 328 of the axle assembly 300 as well. In any event, the seal 336 is shown being coupled to a surface 406 of the axle spindle 310. The material removed from the axle spindle 310 may form a bore 404, as shown. A portion of the seal 336 is located within the bore 404, with a remaining portion of the seal 336 extending out of the bore 404. The remaining portion of the seal 336 may include a first lip 400 and a second lip 402. In the implementation of FIG. 4, a seal journal or interface 408 is formed on an outer portion of the axle shaft 302 upon which the first lip 400 and second lip 402 may contact. As described above, the axle shaft 302 rotates, and thus the journal or interface 408 rotates relative to the seal 336. The seal 336 may be rotationally fixed to the axle spindle 310 in the implementation of FIGS. 3 and 4, and thus the first lip 400 and second lip 402 may be in continuous contact with the rotating journal or interface 408 of the axle shaft 302.

Figure 5:
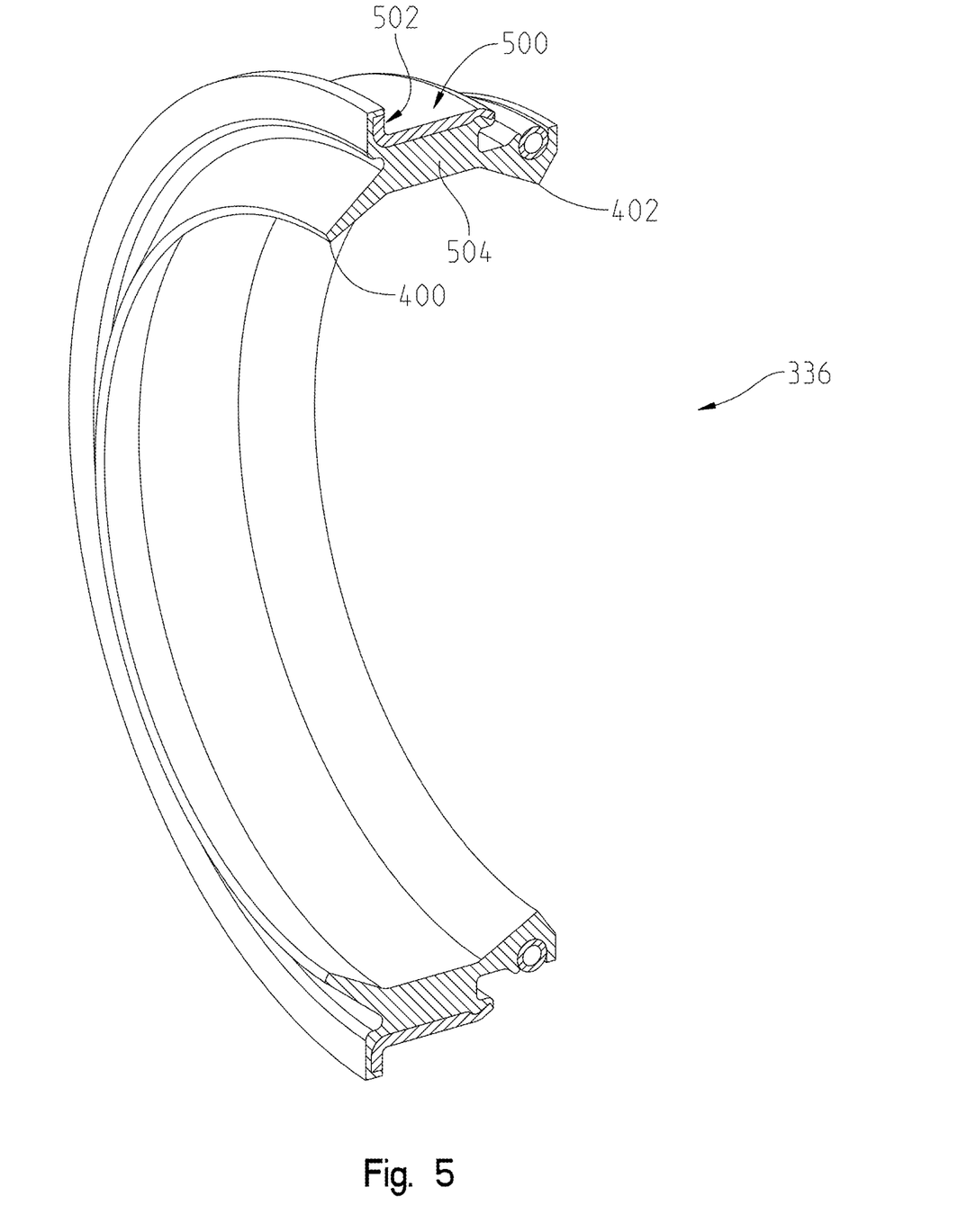
FIG. 5 is a perspective cross-sectional view of a seal.

In FIG. 5, one implementation of a double lip seal 336 is illustrated. As shown, only a portion of the seal 336 is shown, but in this implementation, the seal 336 includes the first lip 400 and the second lip 402. The first lip 400 extends from a body 504 of the seal 336 in a general direction towards the second end 306 of the axle assembly 300 when installed. Conversely, the second lip 402 extends from the body 504 of the seal 336 in a general direction towards the first end 306 of the axle assembly 300. Thus, the first lip 400 and the second lip 402 are spaced from one another. An outer portion of the seal 336 may include a first mounting surface 500 and a second mounting surface 502. In the implementation of FIG. 5, the first mounting surface 500 may be generally perpendicular to the second mounting surface 502. In other implementations, the first mounting surface 500 may be angled relative to the second mounting surface 502. As shown in FIG. 4, the first mounting surface 500 of the seal 336 may be coupled to and in contact with the surface 406 of the axle spindle 310. The second mounting surface 502 of the seal 336 may be coupled to and in contact with another surface 410 of the axle spindle 310. In this implementation, the seal 336 may be coupled to at least two or more surfaces of the axle spindle 310. In FIG. 4, the surface 406 of the axle spindle 310 may be a first surface, and the other surface 410 may be a second surface. For sake of both surfaces, the first surface 406 may be disposed generally perpendicular to the second surface 410. In other implementations, however, the first surface 406 may be congruent and/or angled relative to the second surface 410. In some implementations, the first surface 406 and second surface 410 may be coupled to one another. In other implementations, the first surface 406 and second surface 410 may be spaced from one another. In several implementations, another coupling or latching feature may be coupled directly to or integrally formed with the axle spindle 310 such that the seal 336 is coupled to the coupling or latching feature rather than directly to the axle spindle 310.

Referring to FIGS. 3 and 4 of the present disclosure, the seal 336 is configured to isolate or separate the first cavity 330 on the axle shaft side of the axle assembly 300 from the second cavity 332 located on the wheel end side. In this arrangement, a first fluid may be used on the axle shaft side and disposed in the first cavity 330, whereas a second fluid may be used on the wheel end side and disposed in the second cavity 332. In some implementations, the first fluid may have a different viscosity than the second fluid. For example, in one implementation, a heavier or lower viscosity fluid (e.g., an ultra-low viscosity fluid) may be used on the axle shaft side in the first cavity 330, whereas a greater viscosity fluid may be used on the wheel end side in the second cavity 332. In other implementations, the fluid in the first cavity 330 may have more viscosity than the fluid in the second cavity 332. In one non-limiting example, 75W90 fluid may be used on the wheel end side in the second cavity 332, whereas TES-668 fluid may be used on the axle shaft side in the first cavity 330. In this example, the 75W90 fluid may help extend the life of the bearings 318, 320 and other components on the wheel end side of the axle assembly 300. On the axle shaft side, the TES-668 fluid may help improve efficiencies and reduce losses.

As is known, change in temperature in each cavity can cause pressure fluctuations. The first and second cavities may form pressure vessels. In some implementations, the pressure fluctuations in the first cavity 330 may be greater than the pressure fluctuations in the second cavity 332. In these implementations, the second lip 402 of the seal 336 may be more robust to better withstand the greater pressure fluctuations to preclude leakage of the fluid in the first cavity 330. The second lip 402 may be designed so as to prevent fluid from the first cavity 330 from leaking into the wheel end side of the axle assembly 330 and reach the second cavity 332. In the same way, the first lip 400 of the seal 336 may be designed to prevent fluid from leaking from the second cavity 332 into the axle shaft side and reach the first cavity 330. Thus, the use of different fluids is possible due to the structural integrity and positioning of the seal 336 relative to the axle spindle 310 and axle shaft 302.

In one implementation of the present disclosure, a method of assembling the axle shaft 302 to the axle assembly 300 may include installing an assembly cone to allow the seal to better withstand movement of the splines of the axle shaft 302. As the axle shaft 302 is inserted into the axle housing 308, the use of the assembly cone can protect the structural integrity of the seal. Once the splines of the axle shaft 302 move past the seal 336 during assembly, the outer diameter of the axle shaft 302 is reduced and therefore there is less or no interference with the seal 336. In some implementations, the assembly cone may be a multi-piece assembly cone.

Figure 6:
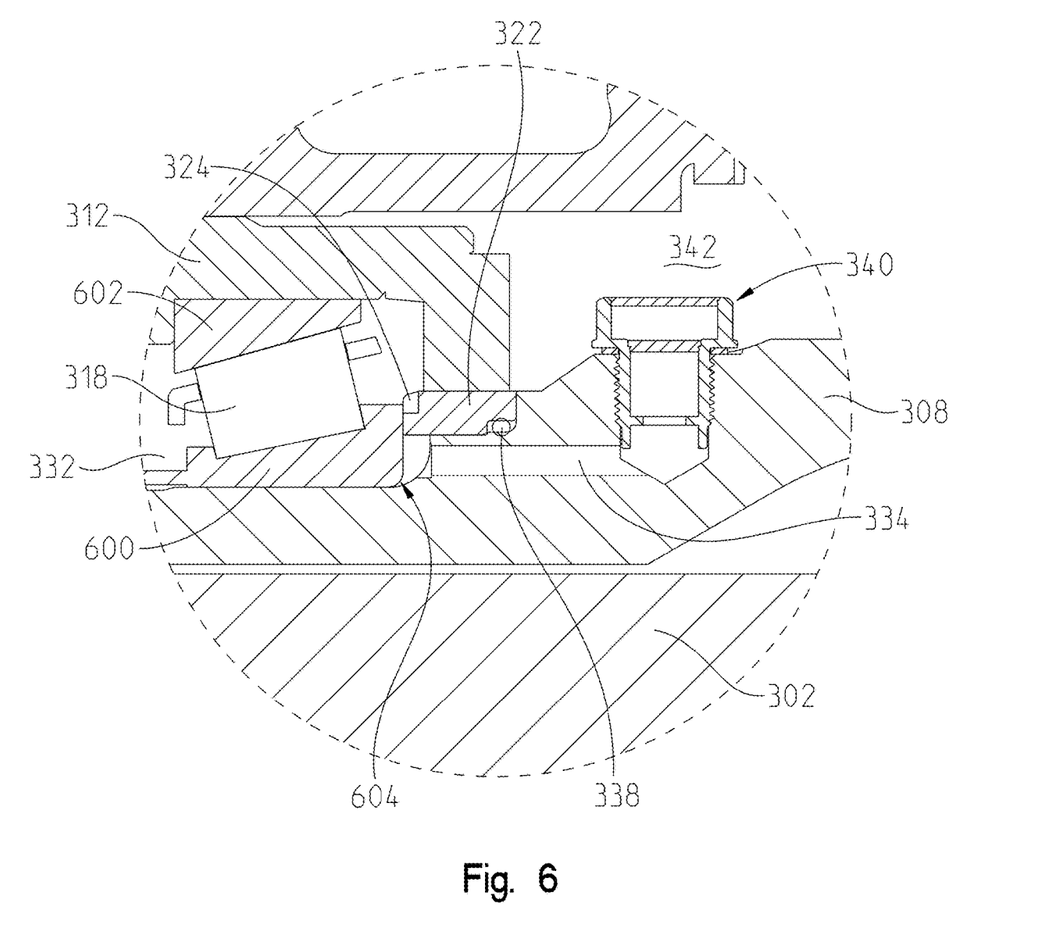
FIG. 6 is another enlarged cross-section view of the implementation of the axle assembly of FIG. 3.

In the implementation of FIGS. 3 and 6 of the present disclosure, there may be pressure fluctuations in the second cavity 332. To help reduce the pressure fluctuations of the fluid in the second cavity 332, a breather 340 may be added to allow air or other gas to escape from the second cavity 332. In FIG. 6, for example, the breather 340 may be positioned between the second cavity 332 and ambient air 342 outside of the axle assembly 300. The breather 340 is designed to allow air to escape from the second cavity 332 but prevent or reduce any fluid from escaping therefrom. In some implementations, the inclusion of the breather 340 is necessary due to the addition of the double lip seal 336. In other implementations, the breather 340 may be included even when the seal 336 is not present.

One issue with a breather is preventing fluid, such as 75W90 fluid, from burping or otherwise flowing out of the breather. This is particularly the case as the pressure in the second cavity 332 changes. The second cavity 332, for example, is a 360° cavity that surrounds the axle spindle 310 on all sides. It is desirable to urge fluid to drain from the upper portion 326 of the second cavity 332 to the lower portion 328 thereof. In the implementation of FIGS. 3 and 6, the addition of the breather 340 also includes an integrated fluid drain to facilitate the drainage of fluid from the upper portion 326 to the lower portion 328 of the second cavity 332. In FIG. 6, for example, a sleeve 322 is located between the wheel end assembly 312, the first bearing 318, the axle housing 308, and the axle spindle 310. An o-ring 338 may be coupled between the sleeve 322 and the axle housing 308 to prevent leakage of air or fluid therebetween.

As shown best in FIGS. 3 and 6, a cross-drilled hole 334 or channel may be formed in the axle spindle 310. The cross-drilled hole 334 or channel allows air to flow from the second cavity 332 to the breather 340 via the cross-drilled hole 334 or channel. In other words, air or other gas may flow from the second cavity 332 through the cross-drilled hole 334 or channel in the axle spindle to the breather 340 which is designed to allow the air or gas to escape to ambient air 342. There is a need to connect the second cavity 332 with ambient air without allowing the air or gas in the second cavity 332 to pass through the axle housing 308 due to the different fluids separated by the seal 336. The inclusion of the cross-drilled hole 334 or channel and breather helps avoid pushing the air or gas through the axle housing.

The sleeve 322 may be designed with a notch 324 formed therein. In some implementations, the sleeve 322 may include a groove, slot, hole, channel, or other structural feature that facilitates a fluid connection between the second cavity 332 and the cross-drilled hole 334 or channel in the axle spindle 310. In the illustrated implementation of FIG. 3, the notch 324 may be formed 360° about the circumference of the sleeve 322. The notch 324 may form a fluid passageway between a face of the sleeve 322 and the first bearing 318 to allow the fluid to fill the notch 324 and drain back to the lower portion 328 of the axle assembly 300. For example, when the axle assembly is stationary, the fluid in the upper portion 326 of the second cavity 332 may flow into and fill the notch 324, where the fluid is urged to flow from the upper portion 326 to the lower portion 328 of the second cavity 332.

In some implementations, the sleeve 322 may include a single notch 324. In another implementation, the sleeve 322 may include two notches. In a further implementation, the sleeve 322 may include at least three notches 324. In yet another implementation, the sleeve 322 may include four or more notches 324. In several implementations, the sleeve 322 may be formed with a plurality of notches 324. In those implementations with more than one notch, each notch 324 may be spaced from the other notches formed in the sleeve 322.

In several implementations, the notch 324 may be 10 mm wide. In other implementations, the notch 324 may be less than 10 mm wide. In further implementations, the notch 324 may have a width of 5 mm or less. In still further implementations, the notch 324 may have a width of 3 mm of less. In yet further implementations, the notch 324 may have a width greater than 10 mm.

In some implementations, the axle spindle 310 may include a single cross-drilled hole 334 or channel. In another implementation, the axle spindle 310 may include two cross-drilled holes 334 or channels. In a further implementation, the axle spindle 310 may include at least three cross-drilled holes 334 or channels. In yet another implementation, the axle spindle 310 may include four or more cross-drilled holes 334 or channels. In several implementations, the axle spindle 310 may be formed with a plurality of cross-drilled holes 334 or channels. In those implementations with more than one cross-drilled hole 334 or channel, each cross-drilled hole 334 or channel 324 may be spaced from the other cross-drilled holes 334 or channels formed in the axle spindle 310.

In some implementations, the cross-drilled hole 334 or channel may be formed as a generally horizontal cross-drilled hole or channel. In other implementations, the cross-drilled hole 334 or channel may be angled relative to a horizontal axis passing through the axle spindle 310. In one implementation, the cross-drilled hole 334 or channel has a first end in fluid communication with the second channel 332 and a second end in fluid communication with the breather 340. In this implementation, the first end may be positioned lower than the second end relative to the horizontal axis. The first end may be desirably lower in this implementation so as to prevent fluid from flowing through the cross-drilled hole 334 or channel and reaching the breather 340. In this implementation, if fluid does enter the cross-drilled hole 334 or channel, the slope of the cross-drilled hole 334 or channel may urge the fluid to flow back towards the first bearing 318 where it can fill the notch 324 and drain back to the lower portion 328 of the second cavity 332. For sake of clarity, the first end of the cross-drilled hole 334 or channel is located closer to the second end 306 of the axle assembly 300, and the second end of the cross-drilled hole 334 or channel is located closer to the first end 304 of the axle assembly 300.

Although not shown in FIGS. 3 and 6, the design of the sleeve 322 and axle spindle 310 may be achieved to avoid high stress points. To do so, the sleeve 322 and axle spindle 310 may be constructed with larger radii (e.g., radius 604 in FIG. 6) to reduce stress points. Further, the sleeve 322 may be extended lengthwise to accommodate larger radii on the axle spindle 310. Moreover, the first bearing 318 (as well as the second bearing 320) includes an inner race 600 and an outer race 602 for supporting the bearing. The extended sleeve 322 may be designed to provide a clamping back surface that contacts the inner race 600 of the first bearing 318, as shown in FIG. 6.

The axle assembly of FIG. 3 may be an electric axle that includes drive gears and an axle shaft side as described above. The first cavity 330, which provides hydraulic fluid for the drive gears and the like in the axle housing 308, supports a lower viscosity fluid or oil that helps reduce spin losses. A transmission or planetary parallel axis gear scheme may be more efficient with lower spin losses due to the lower viscosity fluid in the first cavity 330. Conversely, the second cavity 332 on the wheel end side may be at least partially filled with a higher viscosity fluid or oil that helps improve bearing life.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An axle assembly for a vehicle, comprising:
   an axle housing having a first end and a second end, the axle housing configured to receive a first portion of an axle shaft;
   an axle spindle coupled to the second end of the axle housing, the axle spindle configured to receive a second portion of the axle shaft;
   a wheel end assembly coupled to the axle shaft, the wheel end assembly comprising an outer surface configured to receive a ground-engaging mechanism of the vehicle;
   a seal coupled to the axle spindle, the seal disposed in contact with an outer surface of the axle shaft; and
   a breather coupled to the axle spindle at a location spaced from the seal;
   wherein, the axle housing, axle spindle, and the axle shaft form a first cavity;
   wherein, the axle spindle, the wheel end assembly, and the axle shaft form a second cavity;
   wherein, the seal is positioned between the first cavity and the second cavity, the seal configured to fluidly seal the first cavity from the second cavity, and
   wherein the breather is located between the second cavity and ambient air external to the axle assembly.

2. The axle assembly of claim 1, further comprising a sleeve coupled to the axle spindle, the sleeve comprising a notch formed therein;
   wherein, the second cavity comprises an upper portion and a lower portion, the upper portion fluidly coupled to the lower portion;
   wherein, the notch forms at least a portion of a drainage passage that fluidly couples the upper portion to the lower portion.

3. The axle assembly of claim 2, further comprising a bearing assembly coupled between the wheel end assembly and the axle spindle, the bearing assembly positioned in the second cavity;
   wherein, a portion of the bearing assembly is in contact with the sleeve.

4. The axle assembly of claim 2, wherein the second cavity is configured to hold a fluid therein, the seal arranged to prevent leakage of the fluid from the second cavity to the first cavity.

5. The axle assembly of claim 4, wherein the axle spindle comprises an elongated channel formed therein, the elongated channel located between the second cavity and the breather.

6. The axle assembly of claim 5, wherein the elongated channel is located between the sleeve and the breather.

7. The axle assembly of claim 5, wherein the second cavity is fluidly coupled to the breather via the notch and the elongated channel.

8. The axle assembly of claim 5, wherein the elongated channel is oriented in a generally horizontal arrangement between the second cavity and the breather.

9. The axle assembly of claim 5, wherein the elongated channel comprises a plurality of elongated channels formed in the axle spindle.

10. The axle assembly of claim 2, wherein the notch comprises a plurality of notches formed in the sleeve.

11. A spindle assembly of an axle assembly, the axle assembly including an axle housing, an axle shaft, and a wheel end assembly, the spindle assembly comprising:
- an elongate body configured to be coupled to the axle housing, the elongate body partially forming a first cavity and a second cavity;
- a seal coupled to the elongate body at a location between the first cavity and the second cavity, the seal configured to be in contact with the axle shaft to fluidly seal the first and second cavities from one another;
- a breather coupled to the elongate body, the breather disposed in fluid communication with the second cavity; and
- a sleeve coupled to the elongate body, the sleeve comprising a notch formed therein;
- wherein, the notch forms at least a portion of a drainage passage through which a fluid in the second cavity may flow from an upper portion of the second cavity to a lower portion thereof.

12. The spindle assembly of claim 11, wherein the seal comprises a double lip seal having a first leg and a second leg.

13. The spindle assembly of claim 12, wherein the first leg of the seal is in fluid communication with the first cavity, and the second leg of the seal is in fluid communication with the second cavity.

14. The spindle assembly of claim 11, wherein the notch comprises a plurality of notches formed in the sleeve.

15. The spindle assembly of claim 11, further comprising an elongated channel formed in the elongate body, the elongated channel located between the second cavity and the breather.

16. The spindle assembly of claim 15, wherein the elongated channel is located between the sleeve and the breather.

17. The spindle assembly of claim 15, wherein the second cavity is fluidly coupled to the breather via the notch and the elongated channel.

18. The spindle assembly of claim 15, wherein the elongated channel comprises a plurality of elongated channels formed in the elongate body.

19. A vehicle comprising:
- a chassis;
- a plurality of wheels coupled to the chassis; and
- a powertrain mounted to the chassis comprising a transaxle that includes a housing, an axle assembly at least partially disposed in the housing, and an axle shaft rotatably driven by the powertrain;
- wherein the axle assembly comprises:
  - an axle spindle coupled to the second end of the axle housing, the axle spindle configured to receive a second portion of the axle shaft;
  - a wheel end assembly coupled to the axle shaft, the wheel end assembly comprising an outer surface configured to receive at least one of the plurality of wheels;
  - a seal coupled to the axle spindle, the seal disposed in contact with an outer surface of the axle shaft; and
  - a breather coupled to the axle spindle at a location spaced from the seal;
  - wherein, the axle spindle and the axle shaft at least partially form a first cavity for holding a first fluid;
  - wherein, the axle spindle, wheel end assembly, and the axle shaft form a second cavity for holding a second fluid, the first fluid and the second fluid comprising different viscosities;
  - wherein, the seal is positioned between the first cavity and the second cavity, the seal configured to fluidly seal the first cavity from the second cavity; and
  - wherein the axle spindle comprises an elongated channel formed therein, the elongated channel located between the second cavity and the breather.

\* \* \* \* \*